Sept. 12, 1939. A. TRAYMAN 2,172,718
GOLD SEPARATOR
Filed Aug. 26, 1937

Inventor
Albert Trayman.
By Lacey & Lacey, Attorneys

Patented Sept. 12, 1939

2,172,718

UNITED STATES PATENT OFFICE 2,172,718

GOLD SEPARATOR

Albert Trayman, Seattle, Wash.; V. S. McBride, administrator of Albert Trayman, deceased, assignor to Albert Trayman, Chicago, Ill.

Application August 26, 1937, Serial No. 161,154

3 Claims. (Cl. 209—186)

This invention relates to a gold separator and one object of the invention is to provide a separator of such construction that it may be very effectively used for removing very fine gold known as "flour gold" from the sand in which it is found.

The principle upon which the separator operates is to deliver the gold bearing sand into a mass of molten lead so that the gold will be melted and sink to the bottom of the lead container while the sand moves upwardly to the surface of the lead and out of the separator, and another object of the invention is to so construct the machine that, when it is in use, the gold bearing sand may be discharged into the lead well below the surface thereof near the bottom of the lead container and evenly distributed in the molten lead.

It is another object of the invention to so construct and mount the portion of the separator through which the gold bearing sand is delivered into the lead that centrifugal force may be employed as the means for discharging the sand and gold.

It is another object of the invention to so construct the separator that the distributor head through which the gold bearing sand is discharged from a tubular conduit into the molten lead may be rotated at a higher rate of speed than the conduit and thus cause a good distribution of the sand and gold to take place while making it unnecessary to rotate the conduit at a high rate of speed.

Another object of the invention is to provide a gold separator which is simple in construction, strong and durable and very easy to operate.

The invention is illustrated in the accompanying drawing, wherein

Figure 1:
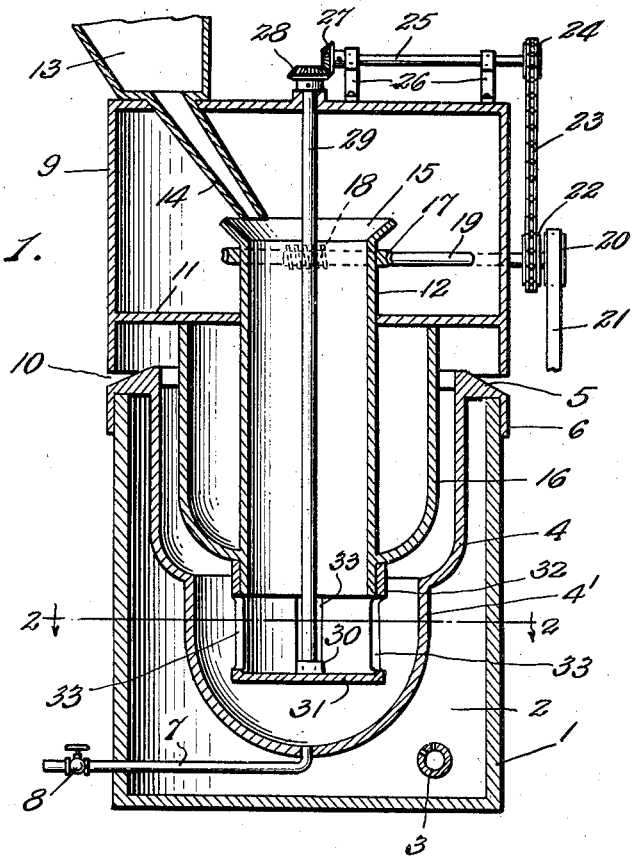
Figure 1 is a sectional view taken vertically through the gold separator.

The body 1 of the separator may be of any height and diameter desired and defines a firebox 2 in which any desired heating medium, such as a burner 3, may be located. A pot 4 for holding lead fits into the fire-box in spaced relation to the walls and bottom thereof and at its upper end is formed with an outstanding annular collar 5 which may be referred to as a shelf and carries a depending flange 6 fitting snugly about the walls of the body. By this arrangement the lead pot 4 will be well supported and prevented from shifting transversely out of centered relation to the body. The lower portion 4' of the lead pot is of reduced diameter and from its bottom leads a draw off tube 7 which projects outwardly through a side wall of the body. It will thus be seen that melted gold may be drawn off through this pipe when the valve 8 is opened. The fact that the lead pot is spaced from the walls and the bottom of the fire-box permits the heat to thoroughly heat all portions of this lead pot, and the fact that the lower portion of the lead pot is of reduced dimensions causes the lead to be kept in a molten state when the separator is in operation and also causes the gold to be quickly melted and gravitate to the bottom of the lead pot.

Figure 2:
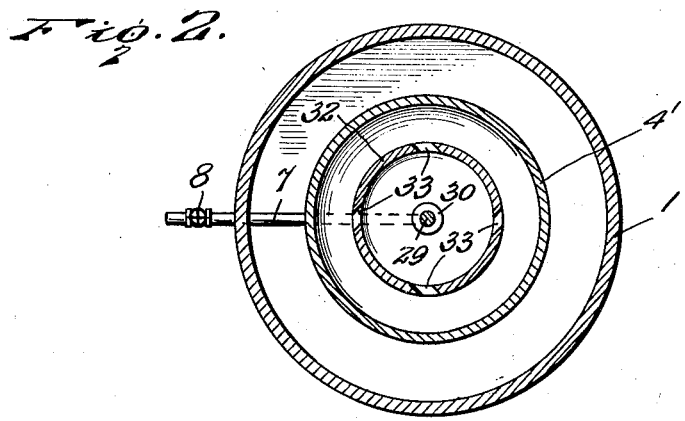
Figure 2 is a transverse sectional view taken horizontally through the separator along the line 2—2 of Figure 1.

A casing 9 is mounted above the body 1 where it will be supported in any desired manner and this casing has the lower edges of its walls spaced upwardly from the collar or shelf 5 to provide a space or passage 10 through which sand may flow after rising to the surface of lead in the lead pot. The bottom 11 of the casing 9 is spaced upwardly from the lower edges of the walls thereof and is formed with a central opening through which extends a tube 12 of such diameter that gold bearing sand which is delivered into the tube from a hopper 13 through a discharge spout 14 may easily pass downwardly through the tube. A collar 15 is formed about the upper end of the tube for directing the gold bearing sand into the tube as it flows from the spout of the hopper. The tube 12 extends downwardly through the lead pot 4 to a point slightly below the upper end of the reduced lower portion 4' of the lead pot and is surrounded by a shell 16 which constitutes an inner wall for the upper portion of the lead pot and has its lower portion of a concavo-convex formation and rigidly secured about the tube either by being formed integral therewith or in any other desired manner. It will thus be seen that, when the tube 12 is rotated, the shell 16 will turn with it and the shell will serve to impart motion to molten lead circumferentially of the lead pot. A gear ring 17 is provided about the upper end portion of the tube 12 slightly below the flared mouth or flange 15 thereof and the teeth of this ring mesh with a worm 18 carried by a shaft 19 which is journaled through one side of the casing 9 and at its outer end carries a pulley 20 for engagement by a belt 21 so that rotary motion may be transmitted to the shaft 19 from a suitable motor. A sprocket wheel 22 is also fixed upon the projecting end portion of the shaft 19 for engagement by a sprocket chain 23 which extends upwardly and is engaged about a sprocket 24 carried by a shaft 25. This shaft is rotatably mounted over the casing radially thereof in bearing brackets 26 and at its inner end carries a beveled gear 27 meshing with another beveled gear 28 carried by the upper end of a shaft 29. The shaft 29 extends through the casing and the tube 12 axially of the tube and is of such length that its lower end portion projects downwardly beyond the open end of the tube. At its lower end the shaft 29 is firmly secured in the boss 30 provided at the center of the bottom 31 of a cup-shaped distributor 32. This distributor has cylindrical walls of such diameter that the upper portion of the distributor fits snugly about the tube 12 between the shell 16 and the lower end of this tube and between the lower end of the tube and its bottom the distributor has its walls formed with blocks 33. The blocks are cut diagonally through the walls, as clearly shown in Figure 2, and upon referring to this figure, it will be seen that, when the distributor head is rotated, centrifugal force may cause the gold bearing sand in the distributor to be thrown outwardly through the slot. In view of the fact that rotary motion is transmitted from the shaft 19 to the tube 12 through the medium of a worm 18 and a large worm gear 17, the tube and the shell carried thereby will be rotated at a very much slower rate of speed than that at which the distributor turns.

In the preferred embodiment of the invention, the tube and the shell 16 are rotated at a speed between sixty to eighty revolutions per minute and the distributor rotates at a speed between twelve hundred and seventeen hundred revolutions per minute, but any specific rates of speed may be provided. It is essential, however, that the distributor rotate at a much higher rate of speed than the tube and the shell.

When this gold separator is in use, the sand bearing the fine gold is placed in the hopper 13 in a dried state or means may be provided for drying the sand while in the hopper. This dry gold bearing sand flows through the spout 14 into the open upper end of the tube 12 and the tube will be filled with sand to a point well above the lower end thereof so that the distributor 32 will at all times be filled with sand. The heat of the burner in the fire-box 2 melts the lead with which the lead pot is filled to a point close to the upper end thereof and, as the distributor head rotates at high speed, the gold bearing sand will be thrown outwardly through the slot 33 towards the walls of the reduced lower portion 4' of the lead pot. The gold in the sand is melted and sinks to the bottom of the lead pot from which it may be withdrawn at predetermined intervals through the draw-off pipe 7 but the sand rises to the surface of the lead and is gradually moved upwardly and out across the shelf 5. The fact that the tube and the shell rotate serve to cause the sand to be well mixed with the molten lead which is moved circumferentially of the lead pot by the turning motion of the shell, and in addition this movement prevents the sand from sticking to the walls of the lead pot or the shell. It will thus be seen that with this improved construction the gold bearing sand will be evenly distributed in the molten lead about the distributor head and at such a depth that melting of the gold and gravitation thereof to the bottom of the lead pot will be assured before the sand is discharged from the lead.

Having thus described the invention, what is claimed as new is:

1. In a gold separator, a fire-box, a pot for holding molten lead disposed in said fire-box in spaced relation to the walls and bottom of the fire-box, an outstanding downwardly sloping shelf surrounding the upper end of said pot and provided with a depending flange surrounding the box, a casing above said pot having a bottom and a depending wall spaced upwardly from said shelf to provide an annular outlet between the casing and said shelf, an open-ended tube rotatably mounted through the bottom of said casing and extending into the lead pot concentric thereto, a shell mounted about said tube within the lead pot in spaced relation to walls thereof for imparting motion to lead in the pot as the tube and said shell are rotated, a hollow distributor head rotatably mounted about the lower end portion of said tube under said shell and having side openings below the tube, and means for imparting rotary motion to the tube and to the distributor with the distributor rotating at a high speed sufficient to create centrifugal force and cause gold bearing material in the tube and distributor head to be discharged through the side openings of the head and into the lower portion of the pot.

2. In a gold separator, a fire-box, a pot in said fire-box for holding molten lead, an outstanding flange forming a shelf extending circumferentially about the upper end of said pot and having its upper surface extending outwardly at a downward incline, said flange having a depending flange fitting snugly about said fire-box and holding the pot in spaced relation to walls of the fire-box, a casing over said pot spaced upwardly from the shelf to provide a circumferentially extending outlet between the shelf and the casing, a tubular conduit rotatably mounted through the bottom of the casing and extending into the pot concentric thereto, a shell for imparting rotary motion to lead in said pot surrounding said conduit and having its lower end fixed to the conduit in spaced relation to the lower end thereof, a distributor head rotatably fitting about the lower end portion of said conduit below said shell and having a portion below the conduit formed with discharge openings in its sides, a shaft for said head extending through the conduit axially thereof and rotatably supported by the casing, a chute extending into said casing over said conduit for delivering gold bearing material into the upper end of said conduit for passage therethrough into the distributor head, and means carried by the casing for imparting rotary motion to the conduit and a faster rotary motion to the shaft and the distributor head carried thereby.

3. In a gold separator, a fire-box, a pot in said fire-box for holding molten lead, the pot having a reduced lower portion and being open at its top and at its upper end surrounded by an outwardly extending annular shell having a depending annular flange fitting snugly about the fire-box to center the pot in the fire-box in spaced relation to walls of the fire-box, a casing over said pot having a top and a bottom and annular side walls extending below its bottom and spaced upwardly from said shelf to provide a circumferentially extending outlet between the shelf and the lower edges of the annular side walls of the casing, a tubular conduit rotatably mounted through the bottom of the casing and extending downwardly into the pot concentric thereto, a shell surrounding the conduit and turning therewith for imparting motion to molten lead in the pot, said conduit having its lower end portion extending below said shell, a hollow distributor head rotatably mounted about the lower end portion of the conduit between the shell and the lower end of the conduit and extending downwardly therefrom into the reduced lower portion of the pot and formed with discharge openings in its sides, a shaft for said head extending through the conduit axially thereof with its lower end fixed to the head and its upper portion journaled through the top of the casing, a hopper upon said casing having a discharge spout extending through the top thereof into the casing and terminating over the upper end of the conduit for delivering mineral bearing material into the conduit for passage therethrough into the distributor head, and means carried by the casing for rotating the conduit and shell at a low rate of speed and imparting rotary motion to the shaft and distributor head at a high rate of speed.

ALBERT TRAYMAN.